(12) United States Patent
Dunhill

(10) Patent No.: US 7,069,786 B2
(45) Date of Patent: Jul. 4, 2006

(54) ULTRASONIC TRANSDUCER STRUCTURES

(75) Inventor: Anthony K Dunhill, Bristol (GB)

(73) Assignee: Rolls-Royce PLC, London (GB)

( * ) Notice: Subject to any disclaimer, the term of this patent is extended or adjusted under 35 U.S.C. 154(b) by 112 days.

(21) Appl. No.: 10/759,168

(22) Filed: Jan. 20, 2004

(65) Prior Publication Data
US 2004/0182130 A1 Sep. 23, 2004

(30) Foreign Application Priority Data
Jan. 23, 2003 (GB) .................................. 0301454.5

(51) Int. Cl.
*G01N 29/00* (2006.01)
*H01L 41/08* (2006.01)

(52) U.S. Cl. .................... 73/632; 641/644; 310/327

(58) Field of Classification Search .................. 73/596, 73/628, 624, 625, 626, 632, 644, 641, 643, 73/602; 310/334, 335, 336, 800, 326, 327, 310/344
See application file for complete search history.

(56) References Cited

U.S. PATENT DOCUMENTS

| 4,211,948 | A | * | 7/1980 | Smith et al. ................. 310/322 |
| 4,635,484 | A | * | 1/1987 | Lerch .......................... 73/628 |
| 4,671,293 | A | * | 6/1987 | Shaulov ....................... 600/447 |
| 5,327,895 | A | * | 7/1994 | Hashimoto et al. ......... 600/459 |
| 6,443,900 | B1 | * | 9/2002 | Adachi et al. .............. 600/458 |
| 6,467,138 | B1 | * | 10/2002 | Aime ........................ 29/25.35 |
| 6,476,541 | B1 | * | 11/2002 | Smith et al. ................. 310/334 |
| 6,701,787 | B1 | * | 3/2004 | Han et al. ....................... 73/629 |
| 6,789,427 | B1 | * | 9/2004 | Batzinger et al. ............. 73/614 |
| 6,815,872 | B1 | * | 11/2004 | Ingram et al. ............... 310/328 |
| 6,831,394 | B1 | * | 12/2004 | Baumgartner et al. ...... 310/334 |
| 6,915,696 | B1 | * | 7/2005 | Dufait et al. ................. 73/626 |
| 2003/0026435 | A1 | * | 2/2003 | Bauer .......................... 381/56 |

FOREIGN PATENT DOCUMENTS

| EP | 0 256 202 A2 | 2/1988 |
| GB | 2 201 318 A | 8/1988 |
| JP | 1170444 A | 7/1989 |

* cited by examiner

*Primary Examiner*—Hezron Williams
*Assistant Examiner*—Jacques Saint-Surin
(74) *Attorney, Agent, or Firm*—Oliff & Berridge, PLC

(57) ABSTRACT

The present invention provides an ultrasonic transducer structure, comprising a first ultrasonic transducer element (1), arranged and operable for transmitting an ultrasonic signal from a front face of the structure, damping material (2) at the back of the first ultrasonic transducer element (1), and a second ultrasonic transducer element (3) in or on the damping material behind the first ultrasonic transducer element (1), arranged and operable to receive sound energy propagated through the damping material (2) when the first ultrasonic transducer element (1) is operated to transmit an ultrasonic signal from the front face. Although sound energy propagating through the damping material (2) is rapidly attenuated, sound energy of a sound pulse travelling to the second ultrasonic transducer (3) from the back face of the first transducer element 1 can be received and the size or amplitude and time delay (arrival time) of this pulse can be monitored and from this information the performance of the first transducer element (1) concerned can be monitored.

9 Claims, 1 Drawing Sheet

ULTRASONIC TRANSDUCER STRUCTURES

Figure 1:
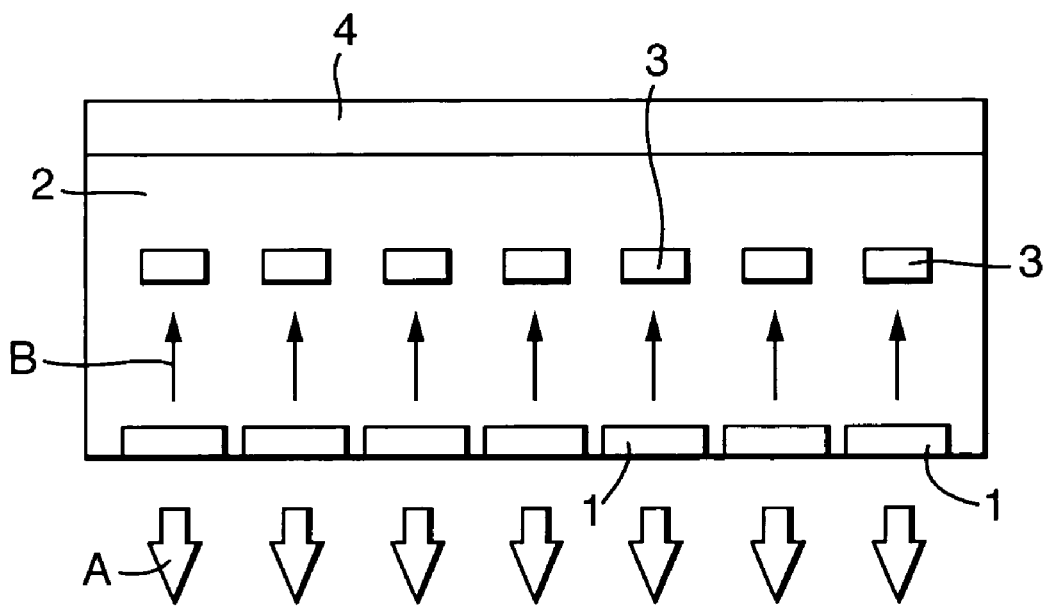

The present invention relates to ultrasonic transducer structures, and methods of monitoring the performance of such structures.

Ultrasonic transducers have long been used in ultrasonic probes for inspection or non-destructive testing and evaluation (NDT/E) of manufactured components. Conventional ultrasonic transducers used for such inspection of manufactured parts have generally contained a single ultrasonic transducer element which generates and detects ultrasonic pulses. Most commonly ultrasonic transducer elements are piezo-electric but other types of element are conceivable, such as magneto-strictive elements.

Ultrasonic technology, including ultrasonic array technology, has also been used for many years for medical applications, for examination of the human or animal body. Ultrasonic transducer arrays use a number of, for example 128, small ultrasonic transducer elements to generate ultrasonic pulses. Typically, such an array comprises a linear or planar array of piezo-electric ultrasonic transmit/receive (TR) transducer elements bonded to a damping material. In use, each element transmits a pulse of ultrasound and then listens for a return. Ultrasonic transducer arrays can offer various advantages. For example they can provide so-called phased arrays which in effect generate shaped ultrasonic pulses which can be steered or focused. In phased array use the elements are carefully synchronised to produce the focused beam and to sweep it through the subject of investigation. For phased arrays to operate correctly the elements are pulsed at slightly differing times to create the overall beam shape required. The pulse timings are called the Focal Law and are specific to individual transducers and beam patterns.

In recent years ultrasonic array structures have been manufactured which provide increased sensitivity, for example achieving the sensitivity needed for the inspection of rotating part components, such as aeroengine critical rotating parts.

Conventionally, in aeroengine production, inspection is carried out on the billet and forgings of all safety critical rotating parts. This inspection is, however, time consuming and costly.

The advance of ultrasonic technology, in particular the advances in array sensitivity, offer the potential for eg phased array steering techniques to be put to use in a way which could reduce inspection time while still maintaining the inspection quality.

However, to achieve guaranteed sensitivity, for example as needed for inspection of safety critical parts but also for other inspection or examination purposes, it is crucial that each transducer element being used is pulsed at the correct time and at the correct amplitude. Thus, consistent generation of pulses is crucial, particularly in the case of inspections or examinations which rely on monitoring signal amplitudes rather than visual image analysis. Hence the performance of each transducer element is critical. For example, a performance shortfall may occur if the bond between a TR transducer element and the damping material degrades, with adverse effect on sensitivity.

However, transducer performance can to date only be indirectly checked, by periodic inspection or examination of a "control" object, wherein the information or image produced is compared with an expected picture or reference information. Such a method precludes 'on-the-job' performance verification whilst the transducer structure is in use for inspection or examination, limiting it to the beginning and end of a shift at best (ie before or after inspection operations). Current ultrasonic systems cannot more directly detect if a transducer element of a transducer structure, particularly of an array transducer structure, is not operating correctly, and without this knowledge the quality of inspection or examinations cannot be guaranteed with a high level of confidence.

According to the present invention there is provided an ultrasonic transducer structure, comprising
a first ultrasonic transducer element, arranged and operable for transmitting an ultrasonic signal from a front face of the structure,
damping material at the back of the first ultrasonic transducer element, and
a second ultrasonic transducer element in or on the damping material behind the first ultrasonic transducer element, arranged and operable to receive sound energy propagated through the damping material when the first ultrasonic transducer element is operated to transmit an ultrasonic signal from the front face.

According to the present invention there is also provided a method of monitoring the performance of an ultrasonic transducer structure, as set out in the paragraph above, used for ultrasonic inspection of an object, wherein the or each second transducer element is operated to detect sound energy propagated through the damping medium from the or the corresponding first transducer element when that element is operated to transmit an ultrasonic signal from the front face of the structure, and signals provided by the or each second transducer element in correspondence to the detected sound energy are analysed, whereby the performance of the or each first transducer element is individually monitored.

Through the provision of the second ultrasonic transducer element behind the first ultrasonic element, the present invention provides for the monitoring of the first (ultrasonic transmitter) transducer element of the ultrasonic transducer structure on the basis of sound energy propagated backwards through the damping material, whereby it can be determined if the first transducer element is operating correctly, so that the quality of an inspection or examination carried out using the structure can be guaranteed to a higher level of confidence.

That the second or monitoring ultrasonic transducer element is incorporated in the transducer structure permits more direct and reliable monitoring of performance than the inspection of "control" objects.

One embodiment of the present invention readily provides for continuous assessment of the performance of each transmitter transducer element in an array. With this embodiment of the invention, the many individual pulses generated by the individual transmitter transducer elements of the array during inspection or examination of an object are monitored by individual monitoring elements corresponding respectively to the transmitter transducer elements, to ensure that the pulse amplitudes and timings of each transmitter transducer element are correct, thus ensuring the inspection is being carried out to the required sensitivity and direction. This monitoring, by monitoring elements behind the transmitter transducer elements, can be effected during inspection without adverse effect on the inspection being carried out.

A further embodiment of the present invention, using a single monitoring element behind the transmitter transducer elements of an array, may be used not for continuous assessment of performance as inspections or examinations are carried out, but for regular testing of all transmitter transducer elements of the array, without recourse to indirect or deductive testing using the "control" object as mentioned above. This embodiment may offer cost savings.

Figure 2:
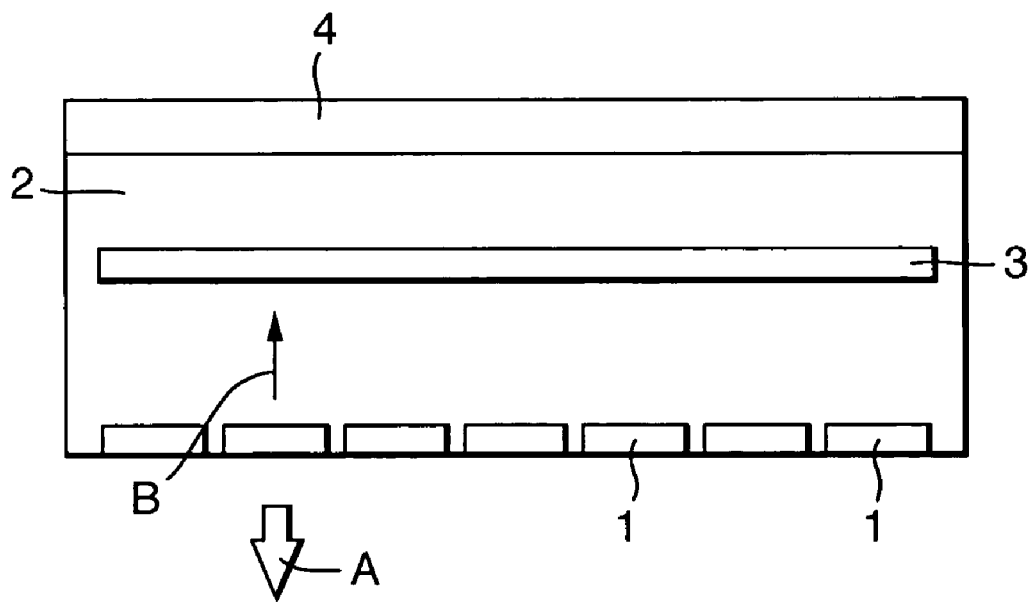

Reference will be made, by way of example, to the accompanying drawings, which show:

FIG. 1 a schematic illustration of an ultrasonic array transducer structure in accordance with a first embodiment of the present invention; and FIG. 2 a schematic illustration of an ultrasonic array transducer structure in accordance with a second embodiment of the present invention.

FIG. 1 illustrates an ultrasonic array transducer structure in accordance with a first embodiment of the present invention, comprising an array of first, transmit/receive (TR) transducer elements 1 at a front face of the structure. The first transducer elements 1 are set in damping material 2. The damping material 2 is used to reduce the ringing of an element after it has been pulsed, in phased array operation, to emit an ultrasonic signal (indicated by A in the Figures), which improves the resolution of the ultrasonic 'A' scan display. At the back of each first transducer element 1 there is included in the damping material 2 a respective second, receive transducer element 3. These second transducer elements may be passive piezo-electric elements made of film (PVDF—Polyvinylidene Fluoride). Although sound energy propagating through the damping material 2 is rapidly attenuated, it has been found that by embedding the second transducer element 3 into the damping material sound energy of a sound pulse (indicated by B in the Figures) travelling to it from the back face of the corresponding first transducer element 1 can be received and that the size or amplitude and time delay (arrival time) of this pulse can be monitored and from this information the "health" of the first transducer element 1 concerned can be monitored.

For example, signals provided by the embedded second transducer elements 3 can be automatically compared to their theoretical values and an assessment made as to the validity of the pulse emitted by the corresponding first transducer element 1. This can be done for each pulse of each first transducer element 1, continuously as the transducer array is operating. Thus, when the transducer structure is used for ultrasonic inspection of examination of an object, array performance can be monitored constantly, to provide a high level of confidence in the quality of the inspections or examinations made.

An example of this ultrasonic transducer structure has been built and it has been confirmed that signals from the back faces of the first transducer elements 1 are readily detectable by the second transducer elements 3. It has also been found that the second transducer elements or monitoring elements 3 do not give rise to any unwanted signals.

Further, it has been found that "cross-talk" at the second transducer elements 3 (ie due to detection of signals from the back faces of different first transducer elements 1) can be resolved on the basis of the different signal timings and/or amplitudes and/or patterns, so that performance monitoring is not hindered.

Preferably, detection of signals from the back faces of the first transducer elements 1 is carried out at lower frequencies (eg 2 to 3 MHz) as higher frequencies are attenuated more rapidly in the damping material.

In a second embodiment of the present invention, an alternative configuration is used in which a single second, receive transducer element or monitoring element 3 is provided, for example as one large PVDF sheet, embedded in the damping material 2.

With this configuration, each first transducer element 1 of the array may be pulsed in turn during a testing routine. Again, the size or amplitude and time delay (arrival time) of the pulse received by the monitoring element 3, from the back face of the first transducer element concerned, can be monitored and so the "health" of the first transducer element 1 concerned can be monitored. The testing routine may be carried out at intervals, when object inspection or examination operations are temporarily suspended, to monitor the condition and performance of the array.

Alternatively, it may be possible to employ the single monitoring element 3 to monitor the first transducers 1 during inspection or examination operations, by demultiplexing and analysing the signals delivered by the monitoring element 3 as a result of the pulses received from the back faces of the first transducer elements 1 as they are pulsed to provide the required (phased) array operation. This would required increased processing power for analysing the signals from the monitoring element 3.

The configuration using a single monitoring element may offer cost advantages over multiple monitoring element structures.

Monitoring of the performance of each first transducer element 1 during a testing routine may of course also be applied with transducer structures such as that of FIG. 1, having an array of monitoring elements 3, in addition to or alternatively to monitoring during object inspection.

In the illustrated embodiments, the monitoring element or elements 3 are shown completely embedded in the damping material 2. Alternatively, however, the monitoring element or elements 3 may be embedded in back face of the damping material 2, in the same manner as shown for the first transducer elements at the front face of the structure, or may be surface mounted on the back of the damping material 2, for example in a backing element 4 illustrated in FIGS. 1 and 2.

In the embodiments of the invention described above the ultrasonic transducer elements 1 are transmit/receive elements operable to transmit ultrasonic pulses into the object to be inspected or examined and to receive resulting ultrasonic refections therefrom. It will be understood that the present invention can also be applied in cases in which the ultrasonic transducer elements 1 are transmit-only elements. In such cases complementary receiver transducer elements may be provided separately from the transmit-only elements, for example on an opposing side of the object to be tested, opposite to the transmit-only elements, in the case of inspection of the object based on through-transmission of signals from the transmit-only elements.

Although the embodiments of the invention described above are concerned with phased array operation, it will be immediately apparent that the present invention can also be applied to other modes of operation and ultrasonic array structures, for example in place of a linear array structure, there may be used curved array, annular array or two-dimensional array structures, or arrays which are shaped to conform to the surface of the object, such as a rotating part, which is to be subjected to investigation or examination.

The invention claimed is:

1. An ultrasonic transducer structure, comprising:
    a first ultrasonic transducer element, arranged and operable for transmitting an ultrasonic signal from a front face of the structure;
    damping material at the back of the first ultrasonic transducer element opposite the front face of the structure; and
    a second ultrasonic transducer element in or on the damping material behind the first ultrasonic transducer element opposite the front face of the structure, arranged and operable to receive sound energy propagated through the damping material when the first ultrasonic transducer element is operated to transmit an ultrasonic signal from the front face.

2. An ultrasonic transducer structure as claimed in claim 1, comprising:
   a plurality of first ultrasonic transducer elements, arrayed and operable for transmitting ultrasonic signals from a front face of the structure;
   damping material at the back of each first ultrasonic transducer element; and
   a plurality of second ultrasonic transducer elements in or on the damping material, arranged behind respective corresponding first ultrasonic transducer elements, each operable to receive sound energy propagated through the damping material when the corresponding first ultrasonic transducer element is operated to transmit an ultrasonic signal from the front face.

3. An ultrasonic transducer structure as claimed in claim 1, comprising;
   a plurality of first ultrasonic transducer elements, arrayed and operable for transmitting ultrasonic signals from a front face of the structure;
   damping material at the back of each first ultrasonic transducer element;
   a second ultrasonic transducer element arranged in or on the damping material behind the array of first ultrasonic transducer elements, operable to receive sound energy propagated through the damping material when any first ultrasonic transducer element of the array is operated to transmit an ultrasonic signal from the front face.

4. An ultrasonic transducer structure as claimed in claim 1, wherein the or each first ultrasonic transducer element is a transmit/receive transducer element.

5. An ultrasonic transducer structure as claimed in claim 1, wherein the or each second ultrasonic transducer element is polyvinylidene fluoride film transducer element.

6. An ultrasonic transducer structure as claimed in claim 1, wherein the or each second transducer element is adapted to detect sound energy at signal frequencies in a lower frequency range, for example at frequencies in the range 2 to 3 MHz.

7. A method of monitoring the performance of an ultrasonic transducer structure, as claimed in claim 1, used for ultrasonic inspection of an object, wherein the or each second transducer element is operated to detect sound energy propagated through the damping medium from the or the corresponding first transducer element when that element is operated to transmit an ultrasonic signal from the front face of the structure, and signals provided by the or each second transducer element in correspondence to the detected sound energy are analysed, whereby the performance of the or each first transducer element is individually monitored.

8. A method as claimed in claim 7, wherein the or each second transducer element is operated to detect sound energy propagated through the damping medium from the or the corresponding first transducer element when that element is operated to transmit an ultrasonic signal from the front face of the structure in the course of inspection of an object, whereby the performance of the or each first transducer element is individually monitored during inspection of the object.

9. A method as claimed in claim 7, wherein the or each second transducer element is operated to detect sound energy propagated through the damping medium from the or the corresponding first transducer element when that element is individually operated to transmit an ultrasonic signal from the front face of the structure in the course of testing routine, when object inspection is not being carried out.

* * * * *